(12) United States Patent
Renault

(10) Patent No.: US 10,677,670 B2
(45) Date of Patent: Jun. 9, 2020

(54) TWISTING TORQUE SENSOR

(71) Applicant: SAFRAN HELICOPTER ENGINES, Bordes (FR)

(72) Inventor: Lionel Renault, Bosdarros (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 1 day.

(21) Appl. No.: 16/068,347

(22) PCT Filed: Jan. 17, 2017

(86) PCT No.: PCT/FR2017/050093
§ 371 (c)(1),
(2) Date: Jul. 5, 2018

(87) PCT Pub. No.: WO2017/125671
PCT Pub. Date: Jul. 27, 2017

(65) Prior Publication Data
US 2019/0025142 A1    Jan. 24, 2019

(30) Foreign Application Priority Data

Jan. 20, 2016 (FR) .................................... 16 50431

(51) Int. Cl.
| *G01L 3/04* | (2006.01) |
| *F01D 21/00* | (2006.01) |
| *F01D 5/08* | (2006.01) |
| *G01L 3/10* | (2006.01) |
| *G01L 3/12* | (2006.01) |

(Continued)

(52) U.S. Cl.
CPC ................ *G01L 3/04* (2013.01); *F01D 5/085* (2013.01); *F01D 17/04* (2013.01); *F01D 21/003* (2013.01); *G01L 3/101* (2013.01); *G01L 3/109* (2013.01); *G01L 3/12* (2013.01); *G01L 3/08* (2013.01); *G01L 3/10* (2013.01); *Y02T 50/676* (2013.01)

(58) Field of Classification Search
CPC ..... G01L 3/04; G01L 3/08; G01L 3/10; F01D 21/003
USPC ...................................................... 73/862.321
See application file for complete search history.

(56) References Cited

U.S. PATENT DOCUMENTS

| 4,774,845 A * | 10/1988 | Barbe ...................... G01L 3/101 73/862.328 |
| 4,899,596 A * | 2/1990 | Janik ....................... G01L 3/101 73/1.11 |

(Continued)

*Primary Examiner* — Octavia Hollington
(74) *Attorney, Agent, or Firm* — Womble Bond Dickinson (US) LLP

(57) ABSTRACT

The invention relates to a twisting torque sensor, comprising a transmission shaft (12) subjected to the torque to be measured, a reference shaft (14), and a device for measuring an angular deformation representing the torque to be measured between the two shafts. The torque sensor is characterised in that the transmission shaft (12) comprises a bore (24) extending from one end of the transmission shaft (12), referred to as input (28) of the shaft, to an opposite end, and in that the torque sensor comprises an enclosure (22) for confining the temperature of the two shafts, and a fluid circulation circuit including a portion made up of said bore (24), an injector (32) for injecting the fluid into the bore (24) at said input (28) of the shaft, and a fluid temperature sensor (34) in the fluid circulation circuit, the measured temperature being intended for correcting the torque measurement.

9 Claims, 1 Drawing Sheet

Figure 1:
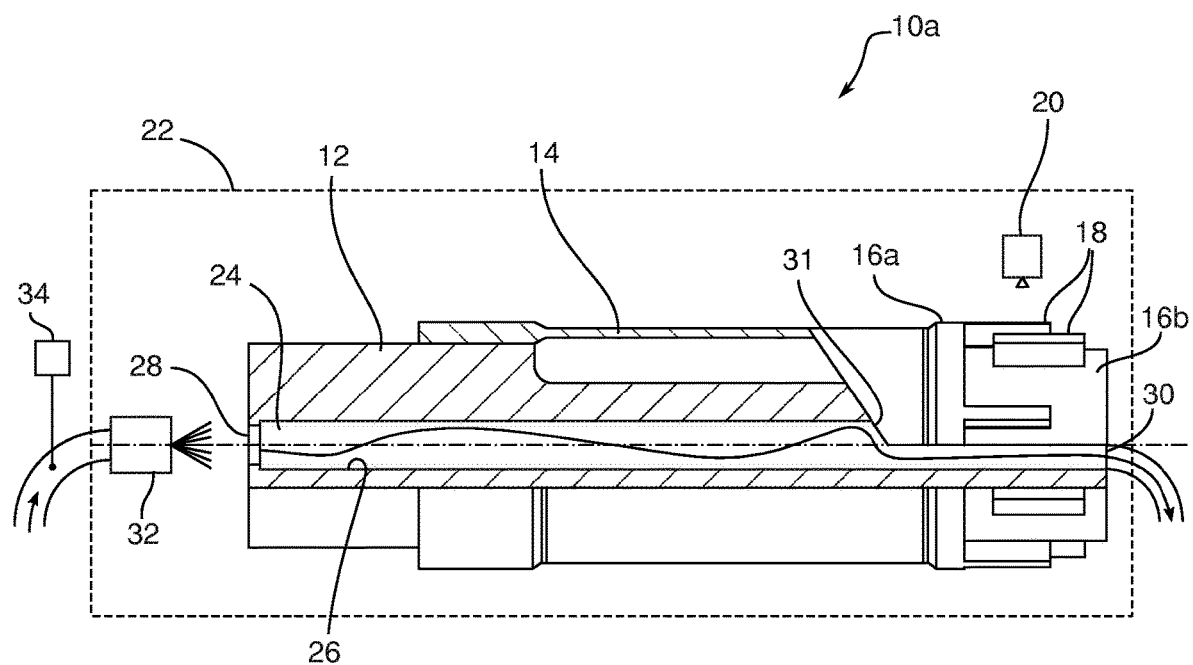

(51) Int. Cl.
*F01D 17/04* (2006.01)
*G01L 3/08* (2006.01)

(56) References Cited

U.S. PATENT DOCUMENTS

| | | | | |
|---|---|---|---|---|
| 8,464,598 B2 * | 6/2013 | Cazaux | ................... | G01L 3/109 |
| | | | | 73/862.08 |
| 8,788,161 B2 * | 7/2014 | Hofig | .................. | F16H 61/0021 |
| | | | | 701/51 |
| 9,032,776 B2 * | 5/2015 | Haehner | ................. | G01L 3/104 |
| | | | | 73/1.09 |

* cited by examiner

TWISTING TORQUE SENSOR

1. TECHNICAL FIELD OF THE INVENTION

The invention relates to a torque sensor. In particular, the invention relates to a twisting-torque sensor intended to measure a torque of a rotating element, in particular in a turbine engine of an aircraft.

2. TECHNOLOGICAL BACKGROUND

Twisting-torque sensors are devices for measuring torque, the operating principle of which is to measure the torsion on a first shaft, referred to as the transmission shaft, subjected to the torque to be measured, and to compare an angular deformation due to this torsion between the transmission shaft and a second shaft, referred to as the reference shaft, which is not subjected to the torque to be measured. The comparison makes it possible to deduce the torque to be measured.

In particular, the measurement of the angular deformation is done by means of the addition to each shaft of reading teeth forming a phonic wheel, and the acquisition by a sensor of the passage of each tooth in front of the sensor. In the absence of torque on the transmission shaft, a reading tooth on the transmission shaft and a reading tooth on the reference shaft are spaced apart by a certain distance. When the transmission shaft is subjected to a torque, the resulting torsion causes the deformation of the shaft and the movement of a reading tooth on the transmission shaft with respect to a reading tooth on the reference shaft. This movement causes a variation in the time taken for the tooth to pass in front of the sensor compared with a tooth on the reference shaft, and makes it possible to deduce therefrom the torque to which the shaft is subjected.

When such a torque sensor is used in an environment in which high temperature variations prevail, for example in a turbine engine of an aircraft, the torsion on the transmission shaft may be different, for the same torque to be measured, depending on the temperature of the transmission shaft. Thus the angular deformation measured varies in the same way, and the measured torque has an error that is more or less great, depending on the temperature for which the torque sensor was calibrated.

In order to prevent measurement errors due to the variable temperature to which the torque sensor is subjected, several solutions have been proposed.

In particular, one solution proposed is to use inclined reading teeth on the phonic wheel, making it possible to reduce the influence of the temperature. However, the correction made by the inclination of the reading teeth is constant and does not depend on the torque. This correction is therefore optimised solely for one torque range and introduces an error outside this range.

Another solution is to place the torque sensor in a confined environment so that it is not subject to any variations in temperature. However, confining the torque sensor reduces the variations in temperature but does not completely eliminate them. The measurement error is thus not corrected and the measurement precision is affected.

Increasingly accurate torque measurement requirements have led inventors to seek novel solutions in response to these problems.

3. OBJECTIVES OF THE INVENTION

The invention aims to overcome at least some of the drawbacks of the known twisting-torque sensors.

In particular, the invention aims to provide, in at least one embodiment of the invention, a torque sensor making it possible to measure torque with great precision.

The invention also aims to provide, in at least one embodiment, a torque sensor wherein the torque measurement is not affected by temperature variations.

The invention also aims to provide, in at least one embodiment of the invention, a torque sensor that can be easily adapted to a plurality of aircraft turbine engines.

4. DISCLOSURE OF THE INVENTION

For this purpose, the invention relates to a twisting-torque sensor comprising a first shaft, referred to as the transmission shaft, subjected to the torque to be measured, a second shaft, referred to as the reference shaft, and a device for measuring an angular deformation between the transmission shaft and the reference shaft, said angular deformation representing the torque to be measured, characterised in that the transmission shaft comprises a bore forming an internal wall and extending from one end of the transmission shaft, referred to as the input of the shaft, to an opposite end, referred to as the output of the shaft, and in that the torque sensor comprises:
- a temperature-confinement enclosure of the first and second shafts, and
- a fluid-circulation circuit, comprising:
  - a portion constituted by said bore of the transmission shaft,
  - a fluid injector into the bore at said input of the shaft, and
  - a temperature sensor, referred to as the main temperature sensor, suitable for measuring the temperature of the fluid in the fluid-circulation circuit, the measured temperature of the fluid being intended for a correction of the torque measurement.

A twisting-torque sensor according to the invention therefore makes it possible to impose a temperature on the transmission shaft by means firstly of the confinement that makes it possible to significantly reduce the influence of the temperature external to the transmission shaft, and secondly because of the circulation of the fluid in the bore formed in the transmission shaft making it possible to impose on the transmission shaft the temperature of the fluid that is known since it is measured by the main temperature sensor. The temperature of the transmission shaft thus being known since it is very close to the temperature of the fluid, it is possible to predict its influence on the angular deformation measured (due to the torsion on the transmission shaft) and therefore to make a correction to the torque measurement according to this temperature of the shaft.

Measuring the temperature of the fluid by means of the temperature sensor is simpler than measuring the temperature of the transmission shaft.

Furthermore, a torque sensor according to the invention makes it possible to simplify the conformation and calibration procedures, in which are determined the conformation parameters allowing a correct measurement of the torque in a real operating situation, for example when the torque sensor is installed in an engine. These conformation parameters form for example the link between the temperature of the transmission shaft and the angular deformation measured, making it possible to deduce the torque therefrom. In the prior art, this conformation must be carried out in the engine in which the torque sensor is to be installed. In the event of a substantial modification of the engine, the conformation of the torque sensor must be carried out once again. In the invention, by virtue of the confinement and the temperature imposed by the fluid, the conformation parameters are independent of the engine in which the torque sensor is installed and the conformation procedure is therefore simplified since it can be carried out in a test engine that can be used by all the torque sensors according to the invention to be conformed, or in a suitable conformation bench without requiring a complete engine.

The fluid-circulation circuit and the temperature sensor form part of a device for correcting the torque measurement. This torque measurement correction device comprises a calculator making it possible, from the temperature measurement supplied by the temperature sensor, to correct the torque measurement.

The torque sensor may further comprise a plurality of temperature sensors. However, since the temperature of the fluid varies little because of the confinement, only one temperature sensor is generally necessary.

Advantageously and according to a first variant of the invention, the transmission shaft and the reference shaft are coaxial, the transmission shaft being disposed inside the reference shaft.

According to this aspect of the invention, the space requirement for the torque sensor is greatly reduced. The assembly formed by the transmission shaft and the reference shaft is sometimes referred to as the torque-sensor shaft.

Advantageously and according to a second variant of the invention, the transmission shaft and the reference shaft are coaxial, the reference shaft being disposed inside the transmission shaft and the fluid circulating between the internal wall of the transmission shaft and an external wall of the reference shaft.

According to this aspect of the invention, the space requirement for the torque sensor is greatly reduced, and the torque sensor is configured so that the fluid is in contact with the internal wall of the transmission shaft, so as to regulate the temperature of the transmission shaft, despite the presence of the reference shaft inside the transmission shaft, that is to say in the bore in the transmission shaft.

Advantageously and according to the invention, the fluid is oil and the fluid-circulation circuit is a hydraulic circuit.

According to this aspect of the invention, the oil is a fluid widely used in the industrial field, the circulation circuits of which are controlled, and allowing good heat exchange with the transmission shaft in order to impose its temperature on it.

Furthermore, when the torque sensor is used in a turbine engine, it is possible to at least partly reuse existing oil-circulation circuits (also referred to as hydraulic circuits). In particular, the main temperature sensor may be a temperature sensor already existing in the turbine engine for another use.

According to other variants of the invention, the fluid may be fuel (kerosene for example), a gas (air for example), etc.

Advantageously and according to the invention, the main temperature sensor is suitable for measuring the temperature of the fluid at the input of the shaft.

According to this aspect of the invention, the main temperature sensor makes it possible to lower the temperature at the input of the shaft, which is close to the temperature that will be imposed on the shaft when fluid circulates in the bore of the shaft.

Furthermore, when the torque sensor is used in a turbine engine, a temperature sensor is frequently present at the start of the hydraulic circuit before circulating in the various items of equipment, and can therefore be used for the torque sensor without requiring the installation of an additional temperature sensor, which would be redundant.

Advantageously and according to this last aspect of the invention, the torque sensor comprises an auxiliary temperature sensor, suitable for measuring the temperature of the fluid at the output of the shaft.

According to this aspect of the invention, adding a second sensor to the output of the shaft makes it possible to detect any variation in the temperature of the fluid after passing through the transmission shaft. This variation can apply in the case of a fault in the confinement of the shafts and may thus be taken into account and corrected by virtue of the second sensor. The measurement of the temperature is thus refined and more robust.

Advantageously and according to the invention, the bore comprises two bore subsections connected by a transition zone, a first subsection on the shaft input side and a second subsection on the shaft output side, the second subsection having a diameter smaller than the diameter of the first subsection.

According to this aspect of the invention, the reduction in the diameter of the bore affords a better circulation of the oil by virtue of the formation of a chicane at the transition zone.

Advantageously and according to this last aspect of the invention, the second subsection is offset with respect to the first subsection and to the bore.

The invention also relates to a turbine engine comprising a rotating shaft, characterised in that it comprises a twisting-torque sensor according to the invention, suitable for measuring the torque of the rotating shaft.

The invention also relates to a torque sensor and a turbine engine characterised in combination by all or some of the features mentioned above or below.

5. LIST OF THE FIGURES

Figure 2:
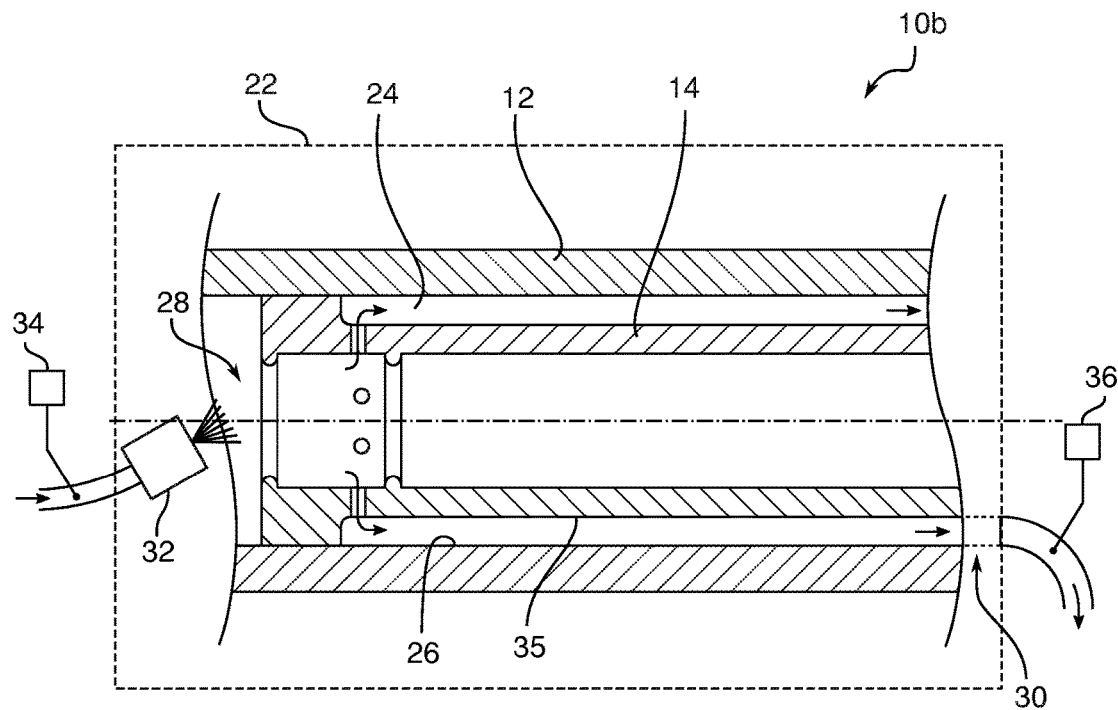

Other aims, features and advantages of the invention will emerge from a reading of the following description given solely by way of a non-limitative example and which refers to the accompanying figures, in which:

FIG. 1 is a schematic view in partial cross section of a twisting-torque sensor according to a first embodiment of the invention, FIG. 2 is a schematic view in cross section of part of a twisting-torque sensor according to a second embodiment of the invention.

6. DETAILED DESCRIPTION OF AN EMBODIMENT OF THE INVENTION

The following embodiments are examples. Although the description refers to one or more embodiments, this does not necessarily mean that each reference relates to the same embodiment, or that the features apply solely to only one embodiment. Simple features of various embodiments may also be combined in order to provide other embodiments. In the figures, the scales and the proportions are not strictly respected, for purposes of illustration and clarity. In particular, the lengths of the various shafts shown may vary according to various embodiments of the invention.

FIG. 1 shows schematically in partial cross section a twisting-torque sensor 100 according to a first embodiment of the invention.

The torque sensor comprises two shafts, a first shaft referred to as the transmission shaft 12 and a second shaft referred to as the reference shaft 14. In this first embodiment, the transmission shaft 12 and the reference shaft 14 are coaxial and the transmission shaft 12 is arranged inside the reference shaft 14.

The transmission shaft 12 is subjected to the torque to be measured by the twisting-torque sensor 10, while the reference shaft 14 is not subjected thereto. Thus the transmission shaft 12 is subject to a torsion representing the torque to be measured.

The transmission shaft 12 and the reference shaft 14 each comprise a phonic wheel 16a, 16b comprising reading teeth 18, the two wheels 16a, 16b being configured so that a reading sensor 20 detects the passage of the reading teeth 18 on the two phonic wheels 16a, 16b. The reading is done for example optically or magnetically, and makes it possible to determine the time between the passage of each tooth and thus the angular deformation between the transmission shaft 12 and the reference shaft 14 due to the fact that only the transmission shaft 12 is subjected to the torque to be measured. The angular deformation, representing the torsion of the transmission shaft 12, makes it possible to determine the torque to be measured. The phonic wheels 16a, 16b and the reading sensor 20 form a device for measuring an angular deformation.

To reduce the influence of the temperature on the torque sensor 10, in particular the influence of the temperature on the torsion of the transmission shaft 12, the torque sensor 10 comprises firstly a temperature-confinement enclosure 22 making it possible to eliminate or limit the influence of the temperature external to the torque sensor 10, and secondly a fluid-circulation circuit making it possible to impose on the transmission shaft 12 a temperature, that of the fluid passing through it.

The fluid-circulation circuit comprises a portion that consists of a bore 24 in the transmission shaft 12, so as to cause the fluid to circulate through this bore 24. The bore 24 forms an internal wall 26 and extends from one end of the transmission shaft 12, referred to as the input 28 of the shaft, to an opposite end, referred to as the output 30 of the shaft. The bore 24 may comprise a plurality of subsections with different diameters connected by transition zones 31 forming one or more chicanes, so as to improve the circulation of the fluid.

The fluid thus circulates in the bore 24 and in contact with the internal wall 26, and thus makes it possible to impose its temperature on the transmission shaft 12, by heat transmission. The confinement of the transmission shaft 12 by the confinement enclosure also makes it possible to ensure that any variations in temperature of the transmission shaft 12 do indeed relate solely to a variation in the temperature of the fluid. The path of the fluid in the bore 24 is represented by an arrow passing through the transmission shaft 12 between the input 28 and the output 30 of the shaft.

The fluid is injected into the bore 24 at the input 28 of the shaft, by means of an injector 32 of the fluid-circulation circuit. The injector 32 allows diffusion of the fluid on the internal wall 26 of the bore, and the circulation of the fluid along the bore 24. At the output of the bore 24, the fluid continues its circulation in the fluid-circulation circuit.

In order to know the temperature of the fluid, the fluid-circulation circuit comprises at least one temperature sensor: in this embodiment, a main temperature sensor 34 is arranged close to the input 28 of the shaft, before the injector 32, so as to measure the temperature of the fluid at the input 28 of the shaft.

The temperature of the fluid thus measured makes it possible to make a correction to the torque measurement of the torque sensor 10: the torsion of the transmission shaft 12 being variable depending on its temperature, knowing this temperature makes it possible to determine the variation in the torsion and to deduce therefrom the correction to be made to the torque determined by means of the sensor 20 for reading the phonic wheels 16a, 16b, so as to obtain a precise measurement of the torque. This calculation of torque from the measurement of the reading sensor 20 and the temperature measured by the main temperature sensor 34 can be carried out for example by a computer (not shown).

The reference shaft 14 does not require any fluid-circulation circuit since it is not subjected to the torque and therefore does not have any torsion variable according to its temperature.

FIG. 2 shows schematically a part of a twisting-torque sensor 200 according to a second embodiment of the invention.

As in the first embodiment, the torque sensor comprises two shafts, a transmission shaft 12 and a reference shaft 14. In this second embodiment, the transmission shaft 12 and the reference shaft 14 are coaxial and, unlike the first embodiment, it is the reference shaft 14 that is arranged inside the transmission shaft 12. To simplify the figure, the parts of the torque sensor 10 comprising the phonic wheels are not shown since they are similar to the first embodiment.

Thus the circulation of the fluid injected by the injector 32 takes place in the bore 24, between the internal wall 26 of the transmission shaft and an external wall 35 of the reference shaft 14. Arrows in the figure show the path of the fluid in the torque sensor.

Furthermore, in this second embodiment, the torque sensor 10 comprises a main temperature sensor 34 and an auxiliary temperature sensor 36 affording a second measurement of the temperature at the output of the shaft. This auxiliary temperature sensor 36 makes it possible to refine the measurement and is useful in the case of faulty confinement of the transmission shaft 12 by the confinement enclosure 22, giving rise to a variation in the temperature of the transmission shaft 12 due to an external element. In practice, imperfect confinement of the transmission shaft 12 causes a variation in temperature between the value at the input of the shaft, measured by the main temperature sensor 34, and the value at the output of the shaft, measured by the auxiliary temperature sensor 36, which remains small. The measured temperature value used for correcting the measurement of the torque sensor 10 can for example be the average between the temperatures measured at the input and at the output of the shaft, in order to take the small variation into account.

The fluid used in the first and second embodiments is for example oil. In particular, when a torque sensor according to one of these embodiments is used in an aircraft turbine engine, the turbine engine comprises an oil hydraulic circuit intended to supply various items of equipment. The oil in this hydraulic circuit may be used to supply the fluid-circulation circuit of the torque sensor. Furthermore, elements of the hydraulic circuit may be reused, for example a temperature sensor for the oil distributed by the hydraulic circuit may be used as a main temperature sensor of the torque sensor, if the oil does not undergo any variation in temperature between this sensor and the input of the shaft.

According to other embodiments, the fluid used may for example be fuel (in particular kerosene) or gas (in particular air), which are also sometimes available in a turbine engine of an aircraft.

The invention claimed is:

1. Twisting-torque sensor, comprising a first shaft, referred to as the transmission shaft, subjected to the torque to be measured, a second shaft, referred to as the reference shaft, and a device for measuring an angular deformation between the transmission shaft and the reference shaft, said angular deformation representing the torque to be measured, wherein the transmission shaft comprises a bore forming an internal wall and extending from one end of the transmission shaft, referred to as the input of the shaft, to an opposite end, referred to as the output of the shaft, and in that the torque sensor comprises:

a temperature-confinement enclosure of the first and second shafts, and a fluid-circulation circuit, comprising:
  a portion constituted by said bore of the transmission shaft,
  a fluid injector to inject fluid into the bore at said input of the shaft, and
  a temperature sensor, referred to as the main temperature sensor, suitable for measuring the temperature of the fluid in the fluid-circulation circuit, the measured temperature of the fluid being intended for a correction of the torque measurement.

2. Torque sensor according to claim 1, wherein the transmission shaft and the reference shaft are coaxial, the transmission shaft being arranged inside the reference shaft.

3. Torque sensor according to claim 1, wherein the transmission shaft and the reference shaft are coaxial, the reference shaft being arranged inside the transmission shaft and the fluid circulating between the internal wall of the transmission shaft and an external wall of the reference shaft.

4. Torque sensor according to claim 1, wherein the fluid is oil and the fluid-circulation circuit is a hydraulic circuit.

5. Torque sensor according to claim 1, wherein the main temperature sensor is suitable for measuring the temperature of the fluid at the input of the shaft.

6. Torque sensor according to claim 5, wherein the twisting-torque sensor comprises an auxiliary temperature sensor, suitable for measuring the temperature of the fluid at the output of the shaft.

7. Torque sensor according to claim 1, wherein the bore comprises two bore subsections connected by a transition zone, a first subsection on the same side as the shaft input, and a second subsection on the same side as the shaft output, the second subsection having a diameter smaller than the diameter of the first subsection.

8. Torque sensor according to claim 7, wherein the second subsection is offset with respect to the first subsection and to the bore.

9. Turbine engine, comprising a rotating shaft, wherein the turbine engine comprises a twisting-torque sensor according to claim 1, suitable for measuring the torque of the rotating shaft.

* * * * *